United States Patent

[11] 3,617,097

[72] Inventor Frederick G. Grabb
 South Bend, Ind.
[21] Appl. No. 28,843
[22] Filed Apr. 15, 1970
[45] Patented Nov. 2, 1971
[73] Assignee The Bendix Corporation

[54] PARKING AND EMERGENCY BRAKING SYSTEM
 4 Claims, 2 Drawing Figs.
[52] U.S. Cl. .................................................. 303/13,
 251/14, 303/2, 303/9, 303/10, 303/52
[51] Int. Cl. .................................................. B60t 13/22
[50] Field of Search .......................................... 251/14;
 303/2, 7, 9, 10, 13, 40, 52, 54, 56, 60

[56] References Cited
UNITED STATES PATENTS
3,272,564  9/1966  Romanini .................... 303/7
3,463,558  8/1969  Nichols ....................... 303/54
3,504,946  4/1970  Valentine et al. ............ 303/9
3,504,947  4/1970  Valentine .................... 303/9 X Primary Examiner—Milton Buchler
Assistant Examiner—Stephen G. Kunin
Attorneys—William N. Antonis and Plante, Arens, Hartz, Smith and Thompson ABSTRACT: A spring brake used in a dual full-power braking system to provide parking and emergency braking. The modulated spring brake is controlled by an inversion valve that has an override system whereby the emergency braking is not applied unless the front brakes have a pressure differential greater than a predetermined amount in the rear brakes. From this pressure differential, the spring brakes are applied simultaneously with the front brakes to provide the necessary emergency stopping. The amount of application of the spring brakes is proportional to the amount of pressure differential in excess of the predetermined amount. The parking brake is an externally connected cam and lever mechanism for operating the inversion valve.

INVENTOR.
FREDERICK G. GRABB
BY
Plante, Arens, Hartz, Smith
& Thompson
ATTORNEYS

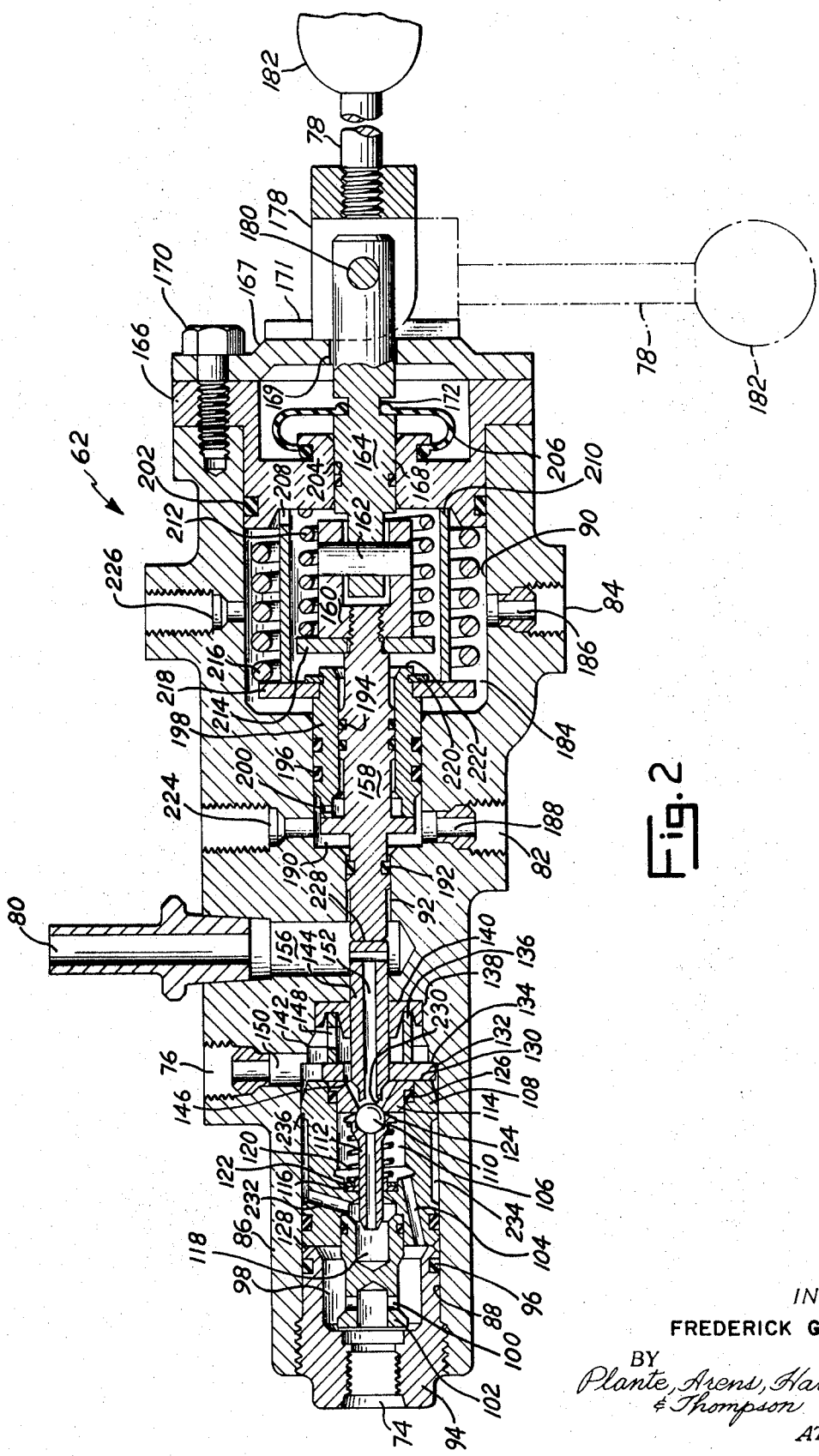

3,617,097

PARKING AND EMERGENCY BRAKING SYSTEM

BACKGROUND OF THE INVENTION

Spring brakes have been utilized in the past as a parking brake, but they have not proved satisfactory as both a parking and emergency brake. One reason for this is the all-or-nothing application of the spring brake. Recently, in conjunction with a dual full power braking system, a type of spring brake that can be modulated was developed. An example of this modulated spring brake can be found in application Ser. No. 797,530 filed Feb. 7, 1969.

At first the control for the spring brake was a simple inversion valve that connected a source of pressurized fluid to the spring brake. Upon application of the spring brake via an externally applied force, the source of pressurized fluid was cut off and the pressurized fluid being supplied to the spring brake was dumped through a return port. If, for some reason, the source of pressurized fluid was lost while driving the vehicle, a spring brake would be applied automatically. Later with the adoption of the split full-power braking system, the emergency braking function was added to the inversion valve. The second means of control of the inversion valve was a pressure differential taken off of the front and rear brakes. If the rear brakes lost pressure, then the amount the front brake pressure exceeded the rear brake pressure would be used to work the inversion valve and apply the spring brake. Again, before the advent of the spring brake capable of being modulated this was on all-or-nothing application. Therefore, if while the vehicle was being driven the rear brakes lost pressure and the operator of the vehicle applied his brakes, then the spring brakes would be applied in full force.

SUMMARY OF THE INVENTION

Accordingly, it is an object of this invention to provide an emergency and parking brake system in a dual full power braking system.

It is a further object of this invention to provide an inversion valve for controlling the hold-off pressure of the spring brake; the inversion valve having two means of control, with the first means being an externally applied force and the second means being a pressure differential between the front and rear brakes.

It is a still further object of this invention to provide an inversion valve with two means for controlling the spring brake; one means being an externally applied force and the other means being controlled by the pressure differential between the front and rear brakes with an override system whereby the spring brake is not applied unless the pressure differential exceeds a predetermined amount.

It is an even further object of this invention to provide the external mechanism for controlling the inversion valve which in turn controls the application of the spring brake.

BRIEF DESCRIPTION OF THE DRAWINGS

FIG. 2 is an elongated cross-sectional view of the inversion valve which controls the application of the spring brakes in FIG. 1.

DESCRIPTION OF THE PREFERRED EMBODIMENT

Figure 1:
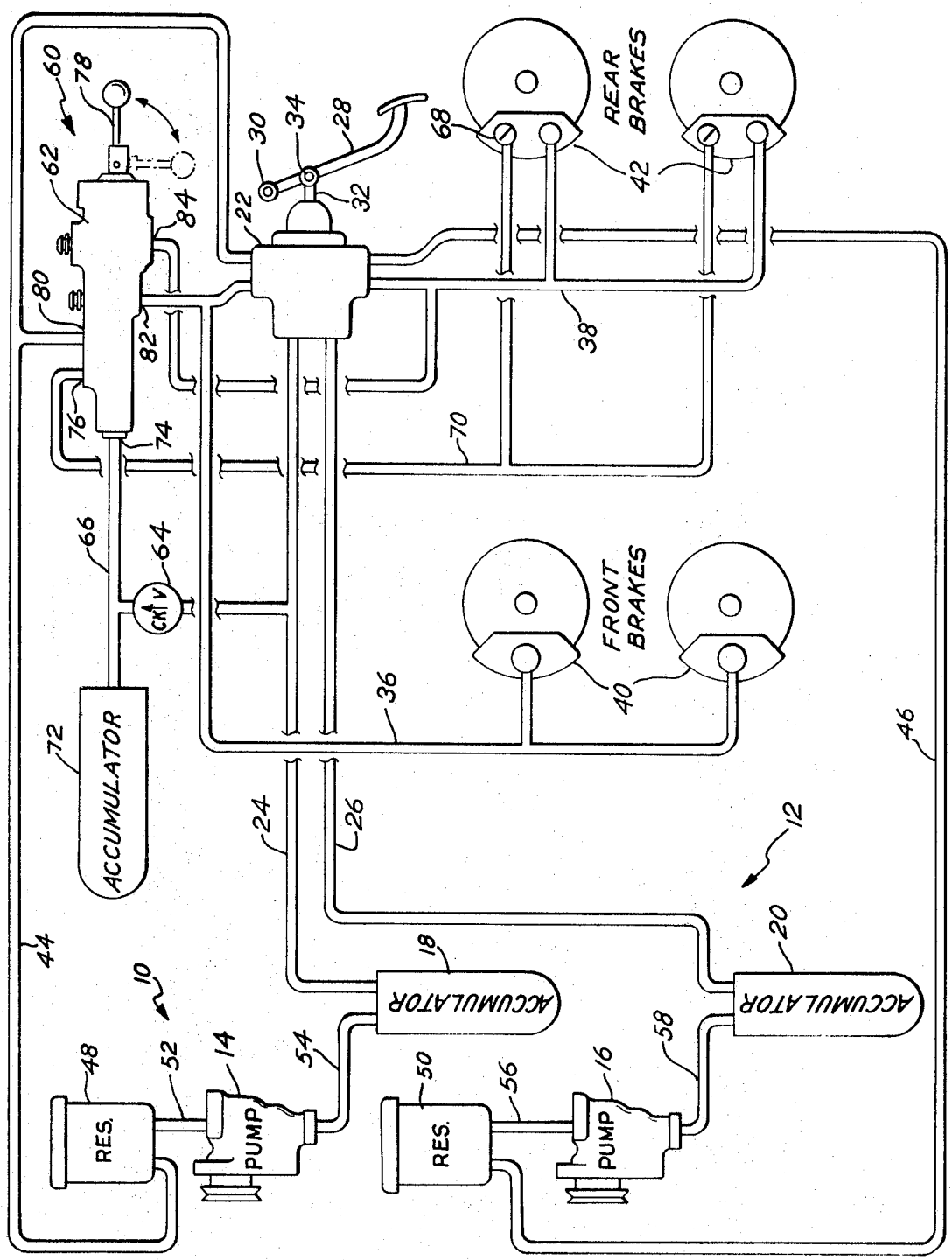
FIG. 1 is a diagrammatic illustration of a dual full-power system utilizing a parking and emergency brake controlled by an externally applied force or a pressure differential.

Referring to FIG. 1, there is shown a dual full power braking system with the front braking system being designated generally by the reference numeral 10 and the rear braking system being designated generally by the reference numeral 12. Each system contains a pump 14 and 16, respectively, operated from the vehicle engine, for storing pressurized fluid in an accumulator 18 and 20, respectively. From the front accumulator 18 and rear accumulator 20, pressurized fluid is delivered to a control valve 22. The control valve which receives the fluid via conduits 24 and 26 is controlled by an externally applied brake pedal 28 which pivots about pin 30. When the driver of the vehicle pushes the brake pedal 28, the shaft 32 which is pivotally connected to pin 34 actuates the control valve 22. During application of the foot brake, the pressurized fluid in conduits 24 and 26 is released to conduits 36 and 38 which operates the front brakes 40 and the rear brakes 42, respectively. Upon release of the brake pedal, the pressurized fluid from the front and rear brakes, 40 and 42, is returned via the control valve conduits 44 and 46 to reservoirs 48 and 50, respectively. The fluid returned to the front reservoir 48 is ready for repressurization by front pump 14 through supply line 52. After the fluid is repressurized, it may again be supplied via conduit 54 to the front accumulator 18. Similarly, the fluid returned to the rear reservoir 50 can be repressurized by rear pump 16 through supply line 56. The repressurized fluid is again supplied to the rear accumulator 20 via conduit 58.

Referring now to the parking and emergency brake system which is designated generally by reference numeral 60, the parking and emergency braking system 60 comprises an inversion valve 62 which supplies pressurized fluid from the check valve 64 and high-pressure line 66 to the spring brakes 68 which are controlled by the pressurized fluid through spring brake line 70. In case of a failure in the front braking system, an emergency accumulator 72 will continue to supply a source of high-pressure fluid to the inversion valve 62. A source of high-pressure fluid which is supplied to the pressure port 74 is normally in communication with spring brake line 70 through brake control port 76 to provide the hold-off pressure for spring brakes 68. When the spring brake lever 78 is moved from the vertical to the horizontal position, communication between pressure port 74 and brake control port 76 is stopped and communication between brake control port 76 and return port 80 is commenced thereby allowing pressurized fluid from spring brake 68 to return through spring brake line 70, through the inversion valve 62, and out conduit 44 to the front reservoir 48.

Another means for removing the pressure from spring brake 68 is a predetermined pressure differential sensed inside the inversion valve 62 whereby the pressure at brake port 82 is greater than the pressure at rear brake port 84 by a predetermined amount. The front brake port 82 is in communication with the pressure being applied to the front brakes 40 through conduit 36. The rear brake port 84 is in communication with the pressure being applied to rear brakes 42 through conduit 38. Upon application of the brake pedal 28, if the pressure realized in conduit 36 to the front brakes 40 is greater than the pressure realized in conduit 38 to the rear brakes 42 by a predetermined amount, then a pressure proportionate to the differential is used to apply the spring brakes 68 in an amount that is approximately equal to the pressure loss in rear brakes 42. This partial application of spring brakes 68 is normally referred to as modulation and the total spring brake may be referred to an a modulated spring brake. Upon release of the brake pedal 28, a pressure differential between the front and rear brakes no longer exists. Therefore, the partially removed fluid pressure from spring brakes 68 via spring brake line 70 and brake control port 76 is returned to full-brake pressure realized at pressure port 74. This modulation function will be explained in more detail subsequently.

For a more complete understanding of the control valve 22, reference is made to U.S. Pat. No. 3,469,890. Also, a conventional engine driven pump as shown by front pump 14 or rear pump 16 can be found in U.S. Pat. No. 3,473,473. The other components shown in this system, with the exception of the inversion valve 62 and the possible exception of the spring brake 68, are conventional and clearly recognized by one skilled in the art.

Referring now to FIG. 2, the inversion valve which is represented generally by the reference numeral 62 consists of a housing 86 with a front compartment 88 and a rear compartment 90 with a communicating channel 92 therebetween. The front compartment is in fluid connection with pressure port 74, brake control port 76 and return port 80. Connection with high-pressure line 66 at pressure port 74 is made by a threadably-connected plug 94 which is sealed to the housing 86 by a sealing means 96. High-pressure fluid from high-pressure line 66 leads into pressure chamber 98 by channel 100 in entrance block 102. The pressure in pressure chamber 98 is fed through inlet channel 104 to poppet chamber 106. In the position as shown in FIG. 2, pressure in poppet chamber 106 is contained by cylindrical portion 108, poppet 110, sleeve 112 and valve seat 114. The seal 116 does not permit pressurized fluid to escape from poppet chamber 106 to pocket 118. A spring 120 acts against a washer 122 and a flange portion 124 of sleeve 112 to keep poppet 110 seated against valve seat 114. A fluid seal 126 is provided between cylindrical portion 108 and valve seat 114.

As plug 94 is tightened into position, forward end 128 abuts cylinder portion 108 forcing the front end 130 of cylinder portion 108 against valve seat retainer 132. Therefore, valve seat retainer 132 is forced against shoulder 134 of a housing 86 and sleeve 136. In turn, sleeve 136 presses against sealing means 138 which abuts shoulder 140 of housing 86.

On the opposite side of valve seat 114 from poppet chamber 106 is a brake chamber 142. When poppet 110 is unseated by a slidable shaft 144, as will be subsequently explained, pressurized fluid will flow from the poppet chamber 106 into the brake chamber 142 by means of a cutout 146 in valve seat retainer 132 and in passage 148 in sleeve 136. From the brake chamber 142 pressurized fluid is communicated to the spring brakes 68 through brake bore 150 and brake control port 76. Upon removing the pressurized fluid to apply the spring brakes 68, the inversion valve 62 is in the position as shown and pressurized fluid from the spring brakes 68 flows into the inversion valve 62 through brake control port 76, brake bore 150, brake chamber 142, passage 148 cutout 146, and into a communicating passage 152 of slidable shaft 144. A radial bore 154 connects the communicating passage 152 to a return bore 156, and subsequently to the return port 80.

The force for moving the slidable shaft 144 is provided by abutting shaft 158. Abutting shaft 158 extends through communicating channel 92 into the rear compartment 90. Abutting shaft 158, which is threadably connected to yoke 160, is pivotally connected by pin 162 to camming shaft 164. Camming shaft 164 extends through end sealing block 166 by means of hole 168. Camming shaft 164 also extends through end cap 167 by means of feedthrough 169. The block 166 and end cap 167 are retained by bolts 170 or any other convenient means of attaching to housing 86. The rearward potion of camming shaft 164 is pivotally connected by pivot 180 to camming surface 178 which acts against the end cap 167. The camming surface 178 when turned by lever 78 will force camming shaft 164 in a horizontal direction by pressing against end cap 167. On the other end of spring brake lever 78 is the operator's grip 182.

The emergency braking aspect of the inversion valve is controlled by a brake pressure differential between front brake port 82 and rear brake port 84. Upon application of the brake pedal 28, a pressure should be realized at front brake port 82 and rear brake port 84. However, if pressure is lost at brake port 84 for any reason whatsoever, there will be a corresponding lack of pressure in rear brake chamber 184 due to communication provided by rear brake bore 186. Because of the communication provided by front brake bore 188, any pressure realized at front brake port 82 will also be realized in front brake chamber 190. The pressure in front brake chamber 190 is maintained by forward seals 192 and rearward seals 194 on abutting shaft 158, and outside seals 196 on concentric piston 198. Passage 200 and concentric piston 198 allows pressure in front brake chamber 190 to be realized on rearward seal 194 as well as outside seals 196.

If on application of the brake pedal 28 a pressure greater than a predetermined amount is realized in front brake chamber 190 than in rear brake chamber 184, the pressure differential across the shaft 158 will cause the abutting shaft 158 to move to the right against the force of spring 212. Spring 212 is compressed between retainer 214 and block 166 if the abutting shaft 158 moves to tight. Upon removal of the pressure differential between front brake chamber 190 and rear brake chamber 184, the spring 212 moves the abutting shaft 158 in the leftward direction.

The pressure in rear brake chamber 184 is also maintained by outside seals 196, rearward seals 194, block seals 202 and camming shaft seals 204. Dust cover 206 that fits in groove 172 of camming shaft 164 helps protect seals 204. Pressure in rear brake chamber 184 can freely flow to the central portion by means of opening 208 in sleeve 210.

If there is a small pressure differential whereby the pressure in front brake chamber 190 exceeds the pressure in rear brake chamber 184 by some small amount below a predetermined pressure difference, this small pressure differential will cause a movement of the concentric piston 198 to the right. The movement of concentric piston 198 to the right will be counteracted by spring 216 which will be compressed between retainer 218 and block 166. The retainer 218 is connected to the concentric piston in an abutting relationship by clip 220. Because the spring 216 counteracts the pressure exerted on an area represented by outside seals 196, which is larger than the area represented by rearward seals 194 and counteracted by spring 212, any small pressure differential below a predetermined amount will cause movement of concentric piston 198 to the right with no substantial movement of abutting shaft 158. When the pressure differential exceeds the predetermined amount, the right end of sleeve 210 will abut cap 166 to prevent any further rightward movement of sleeve 210, retainer 218 and concentric piston 198. Thereafter, any further increase in the pressure differential will act against rearward seals 194 to cause rightward movement of abutting shaft 158. Because the area contained in rearward seals 194 is much less than the area contained in outside seals 196, abutting shaft 158 will not move as much per change in pressure differential as did concentric piston 198.

The inversion valve, as shown in FIG. 2, is operated by the mechanical lever whereby the pressure to the spring brakes 68 is removed and the spring brakes 68 are applied. There is not significant pressure differential between front brake chamber 190 and rear brake chamber 184.

It will be understood that the connection of the front brakes 40 to front brake port 82 and the connection of the rear brakes 42 to rear brake port 84 could be reversed. Although this inversion valve 62 was designed in conjunction with a large truck wherein a higher percentage of the braking effort is exerted by the rear brakes 42 than the front brakes 40, in a passenger car it may be desirable that the functions be reversed, because in a passenger car the majority of the braking force is normally exerted by the front brakes. Also on initial installation of the system, bleed valve 224 removes any air from front brake chamber 190 and bleed valve 226 removes any air from rear brake chamber 184.

MODE OF OPERATION OF THE PREFERRED EMBODIMENT

To remove the parking brake, spring lever 78 must be moved from the horizontal to the vertical position (shown in phantom lines in FIG. 2) Movement of the spring brake lever 78 will turn the camming surface 178 which will release the pulling force on pin 180 provided by the eccentric shape of camming surface 178. Due to the counteracting force of springs 212 and 216, the concentric piston 198, abutting shaft 158, yoke 160, pin 162, and camming shaft 164 will move to the left. The leftward movement of camming shaft 164 will pull the camming surface 178 leftward until it again abuts end cap 167. Flanges 171 on the end cap 167 prevents the camming surface 178 from pivoting about the longitudinal axis of inversion valve 62. During the leftward movement of abutting shaft 158, the abutting end 228 of abutting shaft 158 pushes slidable shaft 144 to the left. As slidable shaft 144 moves to the left, communicating passage opening 230 seats against poppet 110 thereby stopping communication between brake control port 76 and return port 80. Further leftward movement of slidable shaft 144 will unseat poppet 110 from valve seat 114 thereby allowing communication between pressure port 74 and brake control port 76. The flow of pressurized fluid from pressure port 74 through the inversion valve 62 out brake control port 76 to spring brakes 68 will release the application of the spring brakes 68.

Assuming that the poppet 110 is unseated from valve seat 114 by slidable shaft 144 and pressure is being applied at brake control port 76 whereby the spring brakes 68 are held off, then if pressure in rear brake chamber 184 is less than pressure in front brake chamber 190 by a small amount, concentric piston 198 will move to the right against spring member 216. There will be no significant movement of abutting shaft 199 However, when the pressure differential exceeds a predetermined amount, rightward movement of concentric piston 198 will be stopped when retainer 218 abuts the left end of sleeve 210 and the cap 166 abuts the right end of sleeve 210. Any further pressure differential will move only the abutting shaft 158 to the right. With a pressure differential wherein the pressure in front brake chamber 190 is greater than the pressure in rear brake chamber 184 by a predetermined amount, pressure in brake chamber 142 will cause slidable shaft 144 to follow abutting shaft 158 to the right to allow partial pressure reduction at brake control port 76, as will be explained more fully in the following paragraphs. As the pressure differential is further increased, the pressure at brake control port 76 is decreased in an approximately linear inverse relationship. When the pressure differential exceeds a maximum point, the pressure at brake control port 76 is fully released through communicating the passage 152 of slidable shaft 144 and radial bore 154 into return port 80.

It has been common practice in the automobile brake industry to use a pressure differential between each part of a dual braking system to control an emergency brake wherein the emergency brake pressure is received from a valve operated by the pressure differential. This invention is just the opposite because the pressure differential is being used to operate a valve to remove the emergency brake pressure. Not only does the emergency brake operate in the opposite manner from most emergency brakes by removing pressure upon sensing a pressure differential, but it does so in an approximately linear inverse relationship to the pressure differential. To more fully explain the linear inverse relationship, refer to the inversion valve 62 in FIG. 2. Assume the predetermined pressure differential has been exceeded so that concentric piston 198 is in its rightmost position. Because the area enclosed by rearward seals 194 is larger than the area enclosed by forward seals 192, any pressure in front brake chamber 190 will tend to move the abutting shaft 158 to the right which will be opposed by spring 212. Another rightward force is exerted on the abutting end 228 of abutting shaft 158 by the pressure in brake chamber 142 acting on slidable shaft 144 at shoulder 140. Therefore, any further increase in pressure differential will result in a slight rightward movement of abutting shaft 158 due to the pressure differential across rearward seals 194. At the same time due to the pressure in brake chamber 142, slidable shaft 144 will follow the rightway movement of abutting shaft 158 thereby unseating communicating passage opening 230 from poppet 110. The unseating of the poppet 110 from communicating passage opening 230 will allow pressure from brake chamber 142 to escape through communicating passage 152 to the return port 80. At the same time, the reduction in pressure in brake chamber 142 also reduces the force exerted by slidable shaft 144 against abutting shaft 158. Hence, due to the decreased rightward force, abutting shaft 158 will move back in the leftward direction again seating communicating passage opening 230 against poppet 110 thereby trapping a reduced pressure in brake chamber 142. As the pressure differential varies between a predetermined valve and a maximum valve, the communicating passage opening 230 will continue to seat and unseat from poppet 110. This seating and unseating of communicating passage opening 230 allows the pressure in brake chamber 142 to vary as approximately the linear inverse of the pressure differential. It should be understood that for a decrease in pressure in brake chamber 142, there is an increase in application of the spring brakes 68.

Referring now to the pressure across poppet 110, pocket 118 is connected by passage 232 to undercut 234. Not shown is another passage that connects undercut 234 to brake chamber 142. Any pressure realized in brake chamber 142 should be realized in pocket 118, on the right side of poppet 110, and at the spring brakes 68. The outside circumference of sleeve 112 at seal 116 and the inside circumference of seat 114 is approximately equal. Therefore, even though poppet 110 is controlling a high-pressure fluid, a like pressure applied to the approximately equal areas on either side of the poppet 110 allows easy seating and unseating of poppet 110 from valve seat 114. The easy seating of poppet 110 against valve seat 114 helps provide a graduated reduction of pressure at brake control port 76. Therefore, for a brake differential that exceeds the predetermined amount but does not exceed the maximum pressure differential, there will be realized at brake control port 76 a proportionate reduction in brake pressure. This partial reduction in pressure at brake control port 76 will allow a partial application of spring brakes 68. If the pressure differential exceeds the maximum pressure differential or the spring brake lever 68 is moved to the horizontal position, then the entire pressure in brake control port 76 is removed and spring brakes 68 are applied full force. For a normal application of the brake pedal 28 where both front and rear brakes function properly, abutting shaft 158 and retainer 214 are held against spring 212 by a slight holding force. This holding force is from a small area difference wherein the cross-sectional area of camming shaft 164 near seal 204 is slightly larger than the cross-sectional area of abutting shaft 158 near seals 194. Because the pressure applied at both areas is the same, there is a small holding force on abutting shaft 158 and retainer 214 that holds them against spring 212.

Once again it should be stressed that for a small pressure differential below the predetermined amount, the concentric piston 198 in conjunction with spring 216 will act as an override system whereby the spring brake 68 will not be applied until the predetermined amount is exceeded. This eliminates wear on the spring brakes 68 and poppet 110 and valve seat 114. Otherwise, during operation of the vehicle the poppet 110 would be continually seating and unseating from valve seat 114 for any small or insignificant pressure differential.

I claim:

1. A vehicle parking and emergency braking valve which controls a spring brake to be used in a dual hydraulic braking system of a vehicle comprising:

a housing with a front and rear compartment; the front compartment having a pressure port, brake control port, and return port, the rear compartment having a first brake pressure port and a second brake pressure port;

valve means for controlling flow of pressurized fluid from said pressure port to said brake control port;

a slidable shaft with a communicating passage therethrough for allowing pressurized fluid to flow from said brake control port out said return port; during the operation of the vehicle, said slidable shaft is normally positioned so that said valve means blocks the flow of pressurized fluid out said return port, and said pressure port and brake control port are in communication;

a control piston means for pushing said slidable shaft, said control piston means being pushed by one of two actuating means, said first actuating means being an external force communicated to said control piston and said second actuating means being a pressure differential between said first and second brake pressure ports communicated to said control piston means; and override means for preventing said second means from communicating said pressure differential to said control piston means unless said pressure differential exceeds a predetermined amount, wherein:

said spring brake is applied when the pushing force of said control piston means is removed to allow said slidable shaft to move thereby seating said valve means to stop flow from said pressure port to said brake control port and, subsequently, unblocking said communicating passage to allow pressurized fluid to flow from said brake control port to said return port.

2. A vehicle parking and emergency braking valve, as recited in claim 1, said override means comprising:

a concentric piston operatively connected to said control piston means, said concentric piston being independently responsive up to said predetermined amount of said pressure differential and first resilient means for counteracting said response of said concentric piston.

3. A vehicle parking and emergency braking valve, as recited in claim 1, said control piston means comprising:

an abutting shaft for pushing said slidable shaft, said abutting shaft being contained in said concentric piston and being less responsive to a small pressure differential than said concentric piston; and second resilient means for counteracting said response of said abutting shaft.

4. A vehicle parking and emergency brake valve, as recited in claim 1, wherein said external force comprises:

a camming shaft operatively connected to said control piston means;

camming means for moving said camming shaft and said control piston means; and lever means for pivoting said camming means.

* * * * *